United States Patent [19]

Goettler et al.

[11] 4,057,610

[45] Nov. 8, 1977

[54] HOSE REINFORCED WITH DISCONTINUOUS FIBERS ORIENTED IN THE RADIAL DIRECTION

[75] Inventors: Lloyd Arnold Goettler; Arthur James Lambright, both of Akron, Ohio

[73] Assignee: Monsanto Company, St. Louis, Mo.

[21] Appl. No.: 599,115

[22] Filed: July 25, 1975

[51] Int. Cl.² .......................... B29D 3/02; B29F 3/04
[52] U.S. Cl. .................................. 264/108; 138/125; 138/172; 264/173; 264/209; 264/211; 425/131.1; 425/380; 425/466
[58] Field of Search ................ 264/108, 209, 173, 95, 264/211, 349; 425/131.1, 380, 466, 467; 138/125, 172

[56] References Cited

U.S. PATENT DOCUMENTS

| | | | |
|---|---|---|---|
| 2,332,829 | 10/1943 | Parsons et al. | 264/75 |
| 2,345,086 | 3/1944 | Becker et al. | 425/467 |
| 2,682,081 | 6/1954 | Fisch | 425/467 |
| 2,973,783 | 3/1961 | Boe | 264/209 |
| 3,125,620 | 3/1964 | Skinner | 425/466 |
| 3,234,597 | 2/1966 | Van Peborgh | 425/380 |
| 3,256,560 | 6/1966 | Adomaitus | 264/108 |
| 3,371,378 | 3/1968 | Baier | 425/467 |
| 3,423,790 | 1/1969 | Gabbrielli | 425/380 |
| 3,431,164 | 3/1969 | Gilbert | 425/380 |
| 3,651,187 | 3/1972 | Cessna, Jr. | 264/108 |

OTHER PUBLICATIONS

Goettler, "Flow Orientation of Short Fibers in Transfer Molding", 25 Annual Conference-S.P.I., 1970, Sect. 14-A, pp. 1-14.

Goettler, "Controlling Flow Orientation in Molding of Short-Fiber Compounds", *Modern Plastics,* Apr., 1970, vol. 47, pp. 140-146.

*Primary Examiner*—Jeffery R. Thurlow

[57] ABSTRACT

A hose comprising extrudable polymer reinforced with discontinuous fibers oriented in the radial direction and a method for preparing such a hose by extrusion are described.

35 Claims, 6 Drawing Figures

HOSE REINFORCED WITH DISCONTINUOUS FIBERS ORIENTED IN THE RADIAL DIRECTION

This invention relates to hose reinforced with discontinuous fibers, particularly to hose reinforced with discontinuous fibers oriented in the radial direction. The invention also relates to methods for preparing discontinuous fiber reinforced hose by extrusion, and particularly to methods for preparing extruded hose reinforced with discontinuous fibers oriented in the radial direction.

BACKGROUND OF THE INVENTION

It is known that forcing a matrix containing discontinuous fibers through a restricted space, by milling or extrusion, orients the fiber in the direction of flow. The alignment of the fibers is similar to the alignment of logs in a moving stream. Thus, extrusion of a matrix containing discontinuous fibers through conventional dies gives a hose in which the fibers are oriented in the axial direction (the direction parallel to the axis of the die). Applicants in their co-pending patent application Ser. No. 428,219 filed Dec. 26, 1973, now abandoned, described a hose reinforced with discontinuous fibers oriented in the circumferential direction which hose is prepared by extruding a polymer matrix containing discontinuous fibers through a die channel having inner and outer surfaces which diverge from the axis of the die to such extent that the ratio of the channel outlet to channel inlet area is two or more.

Hoses with fibers oriented in the axial direction have great longitudinal strength because of the fiber reinforcement in that direction, whereas, hoses with fibers oriented in the circumferential direction can withstand greater internal pressure with less expansion because of the fiber reinforcement around the circumference of the hose. However, in both the aforesaid hoses the fibers are oriented parallel to the surface of the hose and the hoses are essentially free of fiber reinforcement in the radial direction.

SUMMARY OF THE INVENTION

It has been discovered that forcing a composite of extrudable polymer and discontinuous fiber through a channel of proper geometry formed between a mandrel and an outer die member results in an extrudate with improved radial properties. Accordingly, the present invention provides a hose of extrudable polymer reinforced with discontinuous fibers oriented in the radial direction. The invention also provides a process for preparing an extruded hose in which the radial component of fiber orientation exceeds the circumferential component of fiber orientation, which comprises extruding a composite of extrudable polymer and discontinuous fibers through a die having a channel of curvilinear cross-section, preferably an annular cross-section, formed between surfaces of a central mandrel and an outer die member in which the channel outlet area is about two or more times the channel inlet area, the channel outlet width is two or more times the channel inlet width and the ratio of the channel outlet width to the channel inlet width is two or more times the ratio of the channel outlet mean radius to the channel inlet mean radius. The radial component of fiber orientation, which relates to the fiber reinforcement of the hose in the radial direction, is therefore, controlled relative to the axial and circumferential components by selecting a die of proper geometry. For example, a hose in which the fiber reinforcement in the radial direction exceeds the fiber reinforcement in the circumferential direction is prepared by extruding composite through a die in which (Ao/Ai) is about two or more and (Wo/Wi) is two or more times (Ro/Ri) wherein Ao is the channel outlet area, Ai is the channel inlet area, Wo is the channel width at the outlet, Wi is the channel width at the inlet, Ro is the channel outlet mean radius (distance from axis to center of channel) and Ri is the channel inlet means radius. The channel inlet is considered to be the point of shortest distance between the die member. It is understood that when (Ao/Ai) is about two or more and (Wo/Wi) is two or more times (Ro/Ri) then (Wo/Wi) is also two or more. A hose in which the fiber reinforcement in the radial direction exceeds that in the circumferential direction and also exceeds that in the axial direction is prepared by extruding composite through a die in which (Wo/Wi) ÷ (Ro/Ri) is two or more and the channel outlet area is about three or more times the channel inlet area. A hose in which the fibers are highly oriented toward the radial direction giving a high degree of reinforcement in that direction is prepared by extruding a composite through a die in which (Wo/Wi) ÷ (Ro/Ri) is two or more and the channel outlet area is about five or more times the channel inlet area. Preferably, the value of (Wo/Wi) ÷ (Ro/Ri) is three or more and, more preferably, is four or more.

The angular placement of the individual fibers throughout the extruded composite constitutes the orientation distribution which determines the directional or anisotropic physical properties of the hose. There is a direct correspondence between the orientation distribution of the fibers and the directional material properties, such as mechanical strength, modulus, or elongation measured under an applied stress or under an internal stress generated by the swelling action of a solvent. The reinforcement anisotropy can be characterized by specifying either the components of the fiber orientation or a corresponding material property for each of the three principal directions in the hose: axial, circumferential and radial.

The term "composite" as used herein means "a mixture of discontinuous reinforcing fibers in a matrix comprising extrudable polymer." The term "channel width" as used herein means the distance between the surface of the mandrel and the surface of the outer die member which forms the channel. The term "components of fiber orientation" means the direction cosines of the fiber axes averaged over the entire population of fibers present in the hose. Fiber orientation may be described by the direction cosines of each fiber axis relative to the $x$, $y$ and $z$ coordinates, in which $x$ is a coordinate parallel to the axis of the die which passes through one end of the fiber, $y$ is the coordinate tangent to a circle concentric to the axis which passes through the same fiber end, and $z$ is the coordinate perpendicular to the plane defined by $x$ and $y$. Thus, when the $y$ and $z$ intercepts are zero so that the fiber is lying along the $x$-axis, the direction cosines $\cos \theta_y = \cos \theta_z = (y/l) = (z/l) = 0$ and $\cos \theta_x = (x/l) = 1$, where $l$ is the fiber length. Conversely, when $x$ and $y$ are zero, then $z$ is equal to the fiber length, and the fiber is oriented entirely in the radial direction. Typically, the value for each direction cosine is greater than zero, meaning that the fiber is tilted away from any particular plane. A mean orientation vector (of unit length) can be derived by averaging the direction cosines over the entire population of individual fibers. The fibers can then be said to be oriented in general toward one of the principal directions, or to have a predominant orientation in that direction, if the mean direction cosine for that direction exceeds each of those for the other two directions. The reinforcing effect of the fibers will of course also be highest in the direction of highest direction cosine. The term "highly oriented" as used herein means the situation when the square of the mean direction cosine for any principal direction exceeds a value of 0.5. In other words, the square of the mean direction cosine for any principal direction, by geometrical considerations, exceeds the sum of the squares of the mean direction cosines for the other two directions. The orientation may be conveniently determined by swelling a specimen of composite hose and measuring the amount of swell in each of the principal directions. The amount of swelling in each direction indicates relative fiber orientation. The specimen swells the least in the direction having the largest component of fiber orientation.

A hose of this invention has a smooth surface and is pliable while in a plastic condition, which facilitates bending to form a shaped hose without significant distortion or loss of surface smoothness. A plastic condition means a state in which the hose is soft enough to be shaped yet capable of retaining a fixed shape after being formed. Thermoplastic polymers, including thermoplastic elastomers, are generally in a plastic condition at elevated temperature and harden upon cooling. Thermosetting polymers, including vulcanizable elastomers, are in a plastic condition while being masticated, compounded, extruded and shaped but lose plasticity upon curing. Thus, with vulcanizable elastomers, a hose is extruded, bent to the desired shape and cured, whereas, with the thermoplastic elastomers, a hose is extruded, bent to the desired shape and then cooled.

The process of the invention is applicable to any die having a channel of curvilinear cross-section formed between surfaces of a central mandrel and an outer die member which surfaces may independently be substantially parallel to, converge toward or diverge from the axis of the die provided the relationships, as recited above, of the ratios of channel area $(A_o/A_i)$, channel width $(W_o/W_i)$ and channel radius $(R_o/R_i)$ are met. Thus, nine arrangements of channel surfaces are possible:

1. the mandrel surface is parallel to the axis with the interior wall of the outer die member diverging from tha axis,
2. the mandrel surface converges toward the axis with the interior wall of the outer die member parallel to the axis,
3. the mandrel surface converges toward the axis and the interior wall of the outer die member diverges from the axis,
4. the surfaces of both the mandrel and the interior wall of the outer die member are parallel to the axis of the die,
5. the mandrel surface is parallel to the axis with the interior wall of the outer die member converging toward the axis,
6. the mandrel surface diverges from the axis with the interior wall of the outer die member converging toward the axis,
7. the mandrel surface diverges from the axis with the interior wall of the outer die member parallel to the axis,
8. the surfaces of both the mandrel and the interior wall of the outer die member converge toward the axis, and
9. the surfaces of both the mandrel and the interior wall of the outer die member diverge from the axis.

A channel surface diverges from the axis of the die when the surface is farther from the axis at the channel outlet than at the channel inlet, and conversely, a channel surface converges toward the axis of the die when the surface is nearer the axis of the die at the channel outlet than at the channel inlet.

To achieve radial orientation when the channel surfaces are formed in accordance to arrangements 1 through 3, the length of the channel must extend a sufficient distance in the direction of extrusion to achieve the necessary increase in channel width and channel area. To achieve radial orientation when the channel surfaces are formed in accordance to arrangements 4 through 7, it is necessary to constrict the channel inlet to obtain the required increases in channel width and channel area in the direction of extrusion. To achieve radial orientation when the channel surfaces are formed in accordance to arrangements 8 and 9, it is only necessary to constrict the channel inlet when the surfaces are substantially parallel or do not diverge sufficiently from each other to provide the required increases in channel width and channel area. The channel inlet may be conveniently constricted by having a weir protruding either from the interior wall of the outer die member or from the surface of the mandrel or both. The height of the weir may be varied to provide any desired channel width at the inlet and corresponding channel inlet area. As previously described, the radial component of fiber orientation may be controlled by varying the ratio of the channel outlet area to the channel inlet area. Of course, it is understood that a weir may also be used in dies having channel surfaces formed in accordance to arrangements 1 through 3, if desired. Dies in which the channel surfaces are formed in accordance to arrangements 1 through 4 are preferred because the requirements of $(A_o/A_i)$ and $(W_o/W_i) \div (R_o/R_i)$ are more readily obtained. Surface arrangements 5 through 9 are suitable for achieving radial orientation but require greater constriction at the inlet (weirs of greater height) because channel surfaces which converge toward each other 5, 6 and 7 or converge toward the axis 8 tend to orient fibers in the axial direction and channel surfaces which diverge from the axis 9 tend to orient fibers in the circumferential direction. A better understanding of the invention may be obtained by reference to the drawings.

DETAILED DESCRIPTION

Figure 1:
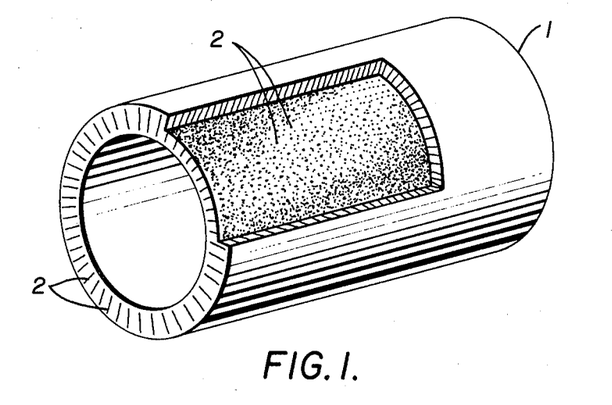
FIG. 1 is a graphic representation of a reinforced hose with a section removed to show the arrangement of discontinuous fibers oriented in the radial direction.

Referring to FIG. 1, hose 1 with a section removed illustrates a hose having fibers 2 oriented in the radial direction. Radial orientation of the fibers is shown in the end cross-section of hose 1 by fibers 2 being aligned so that they point toward the axis of symmetry of the hose. In the portion of hose 1 in which a section is removed, only the ends of fibers 2 (or cross-sections of fibers) are in view.

Figure 2:
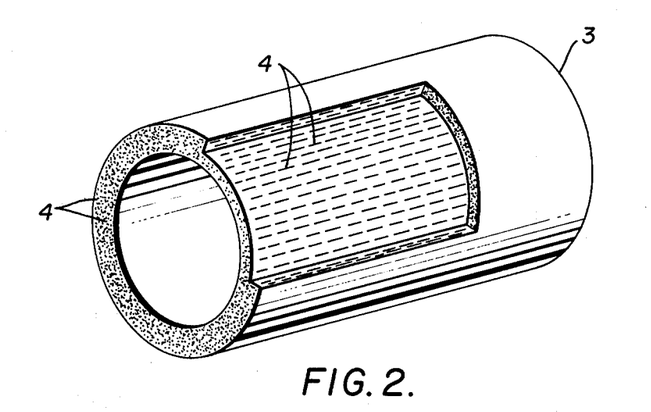
FIG. 2 is a graphic representation of a reinforced hose with a section removed to show the arrangement of discontinuous fibers oriented in the axial direction.

FIG. 2 shows hose 3 having fibers 4 oriented in the axial direction in which the fibers are aligned substantially parallel to the axis of symmetry of the hose. In the end cross-section of hose 3, only the ends of fibers 4 (or cross-sections thereof) are in view, whereas, substantially the entire length of fibers 4 are visible in the portion of hose 3 in which a section is removed.

Figure 3:
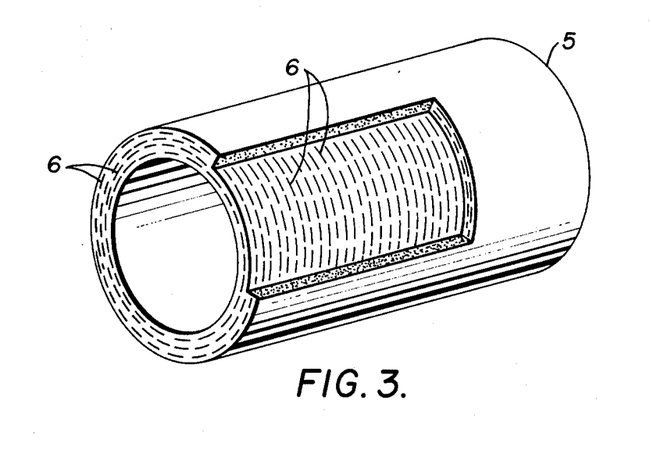
FIG. 3 is a graphic representation of a reinforced hose with a section removed to show the arrangement of discontinuous fibers oriented in the circumferential direction.

Referring to FIG. 3, hose 5 is shown having fibers 6 oriented in the circumferential (hoop) direction in respect to the axis of the hose. In circumferential orientation, fibers 6 are aligned in the direction of the circumference of the hose, therefore, substantially the entire lengths of fibers 6 are visible in both the end cross-section of hose 5 and in the portion of hose 5 in which a section is removed.

Of course, it is understood that FIGS. 1, 2 and 3 are idealistic representations. Normally, a number of fibers are tilted from any particular plane of orientation and all three orientations, axial, circumferential and radial, co-exist with one type of orientation generally predominating.

Axial orientation as shown in FIG. 2 may be achieved by extruding a matrix containing discontinuous fibers through a die having a channel of equal or diminishing channel width which channel is essentially parallel to the direction of extrusion; however, minor numbers of fiber may still be oriented in the other two planes. Circumferential orientation as shown in FIGS. 3 may be achieved by extruding a matrix containing discontinuous fibers through a die having a channel in which both channel walls diverge outwardly from the axis. Radial orientation as shown in FIG. 1 is achieved by extruding a matrix containing discontinuous fibers through dies illustrated in FIGS. 4, 5 and 6.

Figure 4:
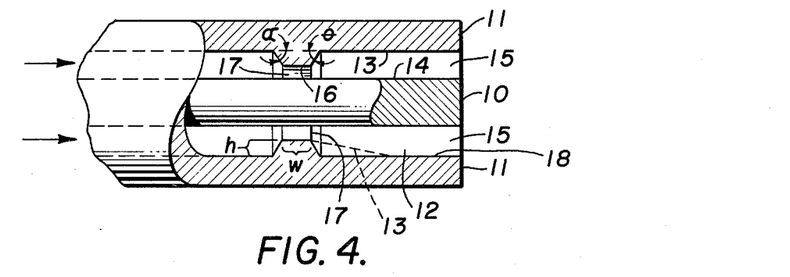
FIG. 4 is a side view of a section of a die cut along a plane through its axis which die has a weir protruding from the outer die member.

FIG. 4 shows a die comprising mandrel 10 with surface 14 and outer die member 11 with interior wall 13. Surface 14 and interior wall 13 form channel 12. Weir 16 of height $h$ and width $w$ protrudes from outer die member 11. Height $h$ may be varied to give any desired ratio of channel outlet area to channel inlet area. The width $w$ of weir 16 is not critical, it may be small, for example 0.1 millimeter or less or may be large such as several centimeters or more. The angles at which the walls of weir 16 join die member 11 may vary. The angle of the upstream weir wall is designated by the symbol $\alpha$ and the angle of the downstream weir wall is designated by the symbol $\theta$. When $\theta$ is large, for example, from about 30°-90°, the downstream wall of weir 16 extends a short distance or not at all toward the outlet with interior wall 13 remaining substantially parallel to the axis of symmetry of the die. However, when $\theta$ is small, for example, less than about 25°, the downstream wall of weir 16 is relatively long and becomes interior wall 13 which wall diverges from the axis of the die as shown by phantom line 13. When interior wall 13 diverges from the axis, it is preferred, that a portion of 13 near outlet 15 remains parallel to the die axis forming land 18. Surface 14 and the top of weir 16 form inlet 17 which inlet 17 has a cross-sectional area less than the cross-sectional area of outlet 15. The direction of extrusion is from left to right. A composite is fed through inlet 17 and an extrudate containing oriented fibers discharges from outlet 15.

Figure 5:
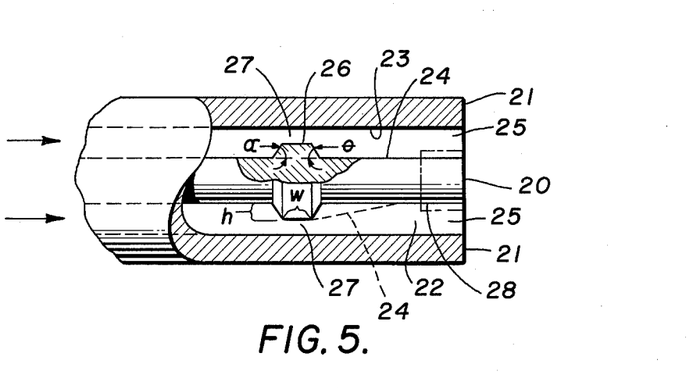
FIG. 5 is a side view of a section of a die cut along a plane through its axis which die has a weir protruding from the mandrel.

Referring to FIG. 5, another die of the invention is illustrated comprising mandrel 20 with surface 24 and outer die member 21 with interior wall 23. Surface 24 and interior wall 23 form channel 22. Weir 26 of height $h$ and width $w$ protrudes from mandrel 20. The designation of the angles at which the walls of weir 26 join mandrel 20 are the same as in FIG. 4. When $\theta$ is large, interior wall 24 is substantially parallel to the axis of symmetry of the die. When $\theta$ is small, the downstream wall of weir 26 becomes surface 24 which surface converges toward the axis of the die as shown by phantom line 24. When surface 24 converges toward the axis, it is preferred that a portion of 24 remains parallel to the die axis forming land 28. Optionally, land 28 may provide for a modest constriction in the width of channel 22 as shown by the phantom lines on the end of mandrel 20. Interior wall 23 and the top of weir 26 form inlet 27 which inlet 27 has a smaller area than outlet 25.

Figure 6:
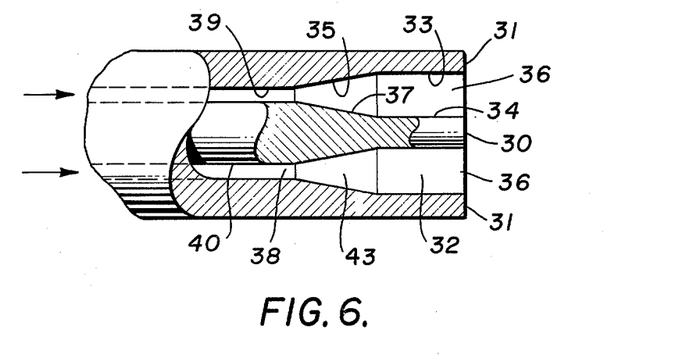
FIG. 6 is a side view of a section of a die cut along a plane through its axis which die has a channel which increases in a cross-section area in the direction of extrusion.

FIG. 6 shows a die comprising mandrel 30 with surface 37 converging toward the axis and surface 34 being substantially parallel to the axis and outer die member 31 with interior wall 35 diverging from the axis and interior wall 33 being substantially parallel to the axis. Interior wall 35 and surface 37 form channel 43. Interior wall 33 and surface 34 form channel 32 and comprise the land portion of the die. Interior wall 39 of outer die member 31 and surface 40 of mandrel 30 form inlet 38. A composite is fed through inlet 38 and an extrudate containing oriented fibers issues from outlet 36.

In one embodiment of the invention, hoses with improved burst strength are prepared by extruding composite through dies as previously described in which the channel is constricted near the outlet to reduce the outlet area about 5% to about 25% from the maximum channel area within the die. In accordance to this embodiment, when the channel is constricted at the outlet, the outlet area is still greater than the inlet area, and preferably the outlet area is two or more times the inlet area.

The reduction of the channel area at the outlet is conveniently effected by providing a constriction of the amount necessary to give the desired reduction in area at the channel outlet, for example, a constriction as illustrated by the phantom lines on the end of mandrel 20 of FIG. 5. Alternately, the constriction may be situated on the interior wall of the outer die member at the outlet or two constrictions may be provided at the outlet with one on the mandrel and the other on the outer die member. The area reduction effected by the constriction at the outlet may be abrupt or gradual, i.e., the upstream edge of the constriction may either join the mandrel, for example, perpendicularly providing a sharp leading edge or at an angle to provide a tapered leading edge. The length of the constriction at the outlet (forming a land potion of the die) is desirably equal or greater than the channel width at the outlet, preferably, the length is 4 to 6 times the channel width. The preparation of hoses by extruding composite through dies having constricted outlets as explained above results in hoses still having fibers oriented toward the radial direction but which exhibit substantially improved burst strength.

Factors other than die geometry may affect fiber orientation at least to a limited extent. For example, such factors as fiber size, fiber loading, matrix viscosity and extrusion conditions, such as temperature and feed rate, will affect fiber orientation. An extrudate issuing from the die which retains its shape indicates that all these variables are within satisfactory limits. However, over wide ranges of fiber size, fiber loading, matrix properties and extrusion conditions, the channel geometry (i.e. the increase in area) is the dominant factor. Also, it is understood that the fiber orientation at the entrance of the die may influence the orientation achieved as the composite passes through the die. Usually the orientation is axial at the entrance. However, the process of the invention is applicable to other orientations at the throat and to randomly disposed fiber.

The length of the channel is variable. For example, the channel length may be about equal to the channel width but generally the channel length is two or more times the channel width. Preferably, the channel length is five or more times the channel width and often is ten or more times. However, it will be appreciated that a lengthy channel increases the pressure drop through the die and that the walls of the channel tend to orient the fiber parallel to their surface in the direction of extrusion. Although not essential, it is preferred when using channels having non-parallel surfaces, to provide a land portion at the channel outlet, the surfaces of the land portion being parallel to the axis of the die. Generally, the length of the land is two or more times, preferably, about 5 or 6 times the width of the channel.

Hose with an annular profile is obtained by extruding composite through a die with a circular outlet in which the mandrel is concentric with the outer die member. Hose with a non-symmetrical curvilinear profile is obtained by extruding composite through a die having a non-circular outlet such as an oval or cigar shaped outlet. Hose with non-uniform wall thickness is obtained by extruding composite through a die in which the mandrel or outer die member have different profiles or by extruding composite through a die in which the mandrel is set off-axis. Hose with non-uniform wall thickness are especially useful in preparing pneumatic tire preforms. The hose is cut to the appropriate length, bent to conform to a tire mold with the thickest area at the crown portion of the tire thereby forming the thread. Hose with either symmetrical or non-symmetrical profiles may be split and laid flat to form a sheet which sheet has a proportion of fibers (more or less depending upon the area expansion through the die) oriented perpendicularly to the surface of the sheet. Normally, when making sheet a hose of 30 centimeters or more in diameter is used. Of course, there is no limit on the size of hose which may be prepared in accordance to the invention. Typically hose size does not exceed ten centimeters in diameter and one centimeter in wall thickness. The invention is particularly advantageous for making small size hose of four centimeters in diameter or less and wall thickness of one to five millimeters.

Any discontinuous fiber may be used. Fibers which reinforce matrices generally include fibers having an average aspect ratio of 10-3000 and more commonly are fibers having an average aspect ratio of 20-1000. A preferred aspect ratio is 20-350 with an aspect ratio of 50-200 being particularly desirable. Various types of organic and inorganic discontinuous fibers are suitable either in monofilament or stranded form (including bundles of fibers bonded together to make a single element which serves as a single fiber in the sense of orientation and reinforcement). Illustrative examples of satisfactory discontinuous fibers are nylon, rayon, polyester, cotton, wood cellulose, glass, carbon, steel, potassium titanate, boron, alumina and asbestos fibers.

The fiber loading is limited only by the workability of the composite. A workable fiber concentration depends upon fiber aspect ratio, minimum clearance through the die and the viscoelastic properties of the matrix. The amount of fiber dispersed in the matrix is generally between 5-200 parts by weight per 100 parts by weight matrix with amounts of 5-75 parts by weight per 100 parts by weight matrix being especially suitable and 10-40 parts by weight per 100 parts by weight matrix being preferred. The aforesaid fiber loading is calculated by considering all of the other ingredients of the composition (polymer, pigments, antioxidants, bonding agents, etc.) besides the fiber, as being the matrix and is not to be confused with fiber loading expressed in parts by weight per 100 parts by weight polymer which is often done for convenience in formulation. The composite may be comprised entirely of polymer and discontinuous fiber with the polymer being the sole matrix material but generally the polymer comprises only a portion of the matrix because of the presence of other compounding ingredients. Typically, the polymer comprises 10-80 weight percent of the composite but more usually, the polymer comprises about 20 to about 50 weight percent of the composite. The proportions of the fiber will usually fall within the range of 20-150 parts expressed as parts by weight per hundred of polymer. Some synthetic rubber formulations normally contain much higher proportions of other ingredients than natural rubber formulations.

The invention is applicable to any extrudable polymer in which fibers can be dispersed. Any polymer which may be extruded through dies by application of pressure is suitable in the practice of this invention. Thermoplastic polymers are particularly suitable, examples of which are polyvinyl chloride, polyethylene, polypropylene, polyvinyl acetate, polyester polymers, for example, poly(ethylene terephthalate), ABS copolymers, polyamides, for example nylon. A preferred class of extrudable polymers are elastomeric polymers. One class of suitable elastomeric (rubbery) polymer comprises thermoplastic elastomers which do not require vulcanization but are shaped above their softening temperature and develop elastomeric properties upon cooling. Examples of satisfactory thermoplastic elastomers are polyurethane-polyester elastomers (commercially available under the Trademark Texin), segmented polyethers and polyesters (commercially available under the Trademark Hytrel), nylon block polymers and dynamically partially cured blends of polyolefin resin and mono-olefinic rubber, (commercially available under the Trademark TPR). U.S. Pat. Nos. 3,806,558, 3,023,192, 3,651,014, 3,763,109, 3,775,373-5, 3,784,520 and 3,533,172 illustrate suitable thermoplastic elastomers. Vulcanizable elastomers comprise another class of extrudable polymers, especially sulfur-vulcanizable diene elastomers. Either natural or synthetic rubbers or mixtures thereof are satisfactory. Illustrative examples of suitable synthetic rubbers include cis-4-polybutadiene, butyl rubber, neoprene, ethylene proplene terpolymers, polymers of 1, 3-butadiene, polymers of isoprene, ethylene vinyl-acetate copolymers and copolymers of 1, 3-butadiene with others monomers, for example, styrene, acrylonitrile, isobutylene and methylmethacrylate.

The matrix may, in addition to polymer and fiber, contain other ingredients commonly found therein, and especially those ingredients necessary for achieving the desired properties of the composite composition. Such materials may include, for example, plasticizers, extender oils, antidegradants, reinforcing and non-reinforcing pigments such as zinc oxide, barium oxide, strontium oxide, iron oxide, silica, carbon black and organic pigments, bonding agents, vulcanizing agents such as sulfur, peroxides and vulcanization accelerators. Preferred elastomer compositions are wood cellulose fiber-elastomer composition described in U.S. Pat. No. 3,697,364 and discontinuous mixed fiber-elastomer compositions described in U.S. Pat. No. 3,709,845, both disclosures of which are incorporated herein by reference.

DESCRIPTION OF PREFERRED EMBODIMENTS

To illustrate the invention, a composite comprising cellulose fiber and vulcanizable rubber composition is extruded through dies having constant channel width but having different area expansions to form 1.27 cm ID hose having about 4.2 mm wall thickness. The extrudate is cut to provide hoses of any desired length. The uncured hose is vulcanized either in an autoclave or in a mold. When making shaped hose, the hose is bent to the desired shape and vulcanized; preferably vulcanization is carried out in a mold. When the shape of the hose is not too complex, an open one-half mold is all that is necessary to maintain the shape during cure. Shaping of the hose and curing in a mold does not significantly affect fiber orientation.

A composite feed material is prepared by incorporating 65 parts of wood cellulose fiber treated to reduce fiber-to-fiber interaction comprising about 66% fiber with the remainder comprising mainly rubber, lubricant and bonding agent, into the following rubber composition.

|  | Parts by Weight |
|---|---|
| EPDM Rubber | 100 |
| FEF carbon black | 122 |
| Extender oil | 85.3 |
| Zinc oxide | 5 |
| Stearic acid | 1 |
| Polymethoxymethylmelamine | 1 |
| Sulfur | 1.5 |
| Dimorpholinodisulfide | 0.8 |
| Tellurium diethyldithiocarbamate | 0.8 |

|  | Parts by Weight |
|---|---|
| Benzothiazyl disulfide | 1.5 |
| Zinc dibutyldithiocarbamate | 2.5 |
| Total | 321.4 |

A number of hoses are prepared using dies according to FIGS. 4 and 5. The dies have constant channel width (both surfaces of the channel being parallel to the axis). The mandrel diameter is 1.27 cm. Other features of the dies are tabulated in Table I.

TABLE I

| Die | FIG. NO. | Weir Dimensions h,mm | Weir Dimensions w,mm | $\alpha$ | $\theta$ | Width,mm $W_i$ | Width,mm $W_o$ | Radius,mm $R_i$ | Radius,mm $R_o$ | Length,cm L | $\dfrac{A_o}{A_i}$ | $\dfrac{W_o}{W_i}$ | $\dfrac{R_o}{R_i}$ |
|---|---|---|---|---|---|---|---|---|---|---|---|---|---|
| A | 5 | 0 | 0 | 0° | 0° | 4.2 | 4.2 | 8.45 | 8.45 | >7.6 | 1 | 1.0 | 1.0 |
| B | 5 | 2.1 | 4.2 | 60° | 60° | 2.1 | 4.2 | 9.5 | 8.45 | 5.6 | 1.8 | 2.0 | 0.889 |
| C | 5 | 3.1 | 4.2 | 60° | 60° | 1.1 | 4.2 | 10.0 | 8.45 | 5.6 | 3.4 | 4.0 | 0.845 |
| D | 5 | 3.5 | 4.2 | 60° | 60° | 0.7 | 4.2 | 10.2 | 8.45 | 5.6 | 5.0 | 6.0 | 0.828 |
| E* | 5 | 2.5 | 1.3 | 90° | 90° | 0.7 | 3.2 | 9.2 | 7.95 | 1.8 | 4 | 4.6 | 0.864 |
| F** | 4 | 3.5 | 2.5 | 45° | 60° | 1.3 | 4.8 | 6.35 | 8.1 | 5.6 | 4.8 | 3.7 | 1.28 |
| G | 4 | 3.5 | 2.5 | 45° | 60° | 0.7 | 4.2 | 6.7 | 8.45 | 5.6 | 7.6 | 6.0 | 1.26 |

*Composite comprises 120 parts treated fiber (75 parts wood cellulose fiber).
**The mandrel diameter of Die F is 1.14 cm.

The composite feed material is extruded using a 8.9 cm vented extruder through dies shown in Table I. The rate of extrusion is about 3 meters per minute with a head pressure in excess of 210 Kg/sq. cm. The die temperature is 100° C+ about 10° C. All hoses are cured for 40 minutes at 160° C. Hose strength is determined by applying steadily increasing hydraulic pressure to a section of hose until burst occurs. The pressure at which the hose ruptures is recorded. Fiber orientation is determined by soaking sections of hose in benzene for 24 hours and measuring the amount of swell. The percent swell is calculated by dividing the original dimension into the change in dimension and multiplying by 100. Axial orientation influences swell in the direction of length, circumferential orientation influences swell in the diameter and radial orientation infuences swell in wall thickness. The amount of swell in any principal direction or dimension is inverse to the component of fiber orientation in that direction. (Coran et al, J. Applied Polymer Science, V15, P. 2471-2485, 1971). The burst strengths and percent swell values for hoses prepared using the dies of Table I are shown in Table II.

TABLE II

| Die | $\dfrac{A_o}{A_i}$ | Pressure at Burst, kg/sq.cm | Percent Swell Axial | Percent Swell Circum. | Percent Swell Radial |
|---|---|---|---|---|---|
| A | 1 | 17.0 | 0 | 19.8 | 22.0 |
| B | 1.8 | 16.9 | 3.2 | 16.5 | 16.1 |
| C | 3.4 | 15.5 | 8.7 | 13.8 | 6.8 |
| D | 5 | 15.2 | 12.2 | 13.1 | 4.8 |
| E | 4 | — | 14.6 | 11.7 | 7.8 |
| F | 4.8 | 17.5 | 16.4 | 10.2 | 5.6 |
| G | 7.6 | 17.9 | 18.4 | 8.8 | 3.4 |

The data show that fiber reinforcement of the hose in the radial direction and hence the component of fiber orientation in that direction increases with the increase in the ratio of channel outlet area to channel inlet area with a corresponding decrease in the component of fiber orientation in the axial direction. The component of fiber orientation in the circumferential direction also increases as the ratio of outlet area to inlet area increases but is always less than the radial component.

Die A is a die having an unobstructed straight channel. The swell data show that essentially all of the fibers are oriented in the axial direction since there is zero swell in that direction. Dies B, C and D are of the same dimensions except they have weirs of different heights protruding from the mandrel which difference in weir height results in different outlet area to inlet area ratios. The swell data for a hose produced with Die B having an area expansion of 1.8:1 shows (compared to a hose produced with Die A) a reduction in the component of fiber orientation in the axial direction since the hose swells 3.2 percent in that direction. The swell data further indicates since the percent swell in the radial direction is less than the percent swell in the circumferential direction that the component of fiber orientation in the radial direction exceeds the component of fiber orientation in the circumferential direction. In a hose produced with Die C having an area expansion of 3.4:1, the swell data indicates that the component of fiber orientation in Dic is therefore given being the same as Dmo because there is no constriction. The constriction should not be confused with an upstream weir when present. The ratio of the channel area of Die H preceding the constriction and the channel inlet is about 3.4:1. Dies J and K each have about a 10% constriction at the outlet. Die K is a hybrid of the dies of FIGS. 4 and 5 since it has two weirs opposite each other at the inlet, i.e., the outer die member of Die K corresponds to an outer die member of FIG. 4 and the mandrel of Die K corresponds to a mandrel of FIG. 5. A constriction on the mandrel at the outlet of Die K provides the indicated reduction in area. The ratio of the channel area of Die J preceding the constriction and the channel inlet area is about 4.8:1 and the ratio of the channel area of Die K preceding the constriction and the channel inlet area is about 8.4:1. The dimensions of the dies are shown in Table III.

TABLE III

| Die | FIG. NO. | h,mm | w,mm | $\alpha$ | $\theta$ | Doo | Dmo | Dic | Lio | Lco | Wo | Wi | Ro | Ri | $\frac{Ao}{Ai}$ | $\frac{Wo}{Wi}$ | $\frac{Ro}{Ri}$ |
|---|---|---|---|---|---|---|---|---|---|---|---|---|---|---|---|---|---|
| H | 5 | 3.1 | 4.2 | 60° | 60° | 21 | 14.7 | 12.7 | 68 | 38 | 3.17 | 1.05 | 8.93 | 9.97 | 2.7 | 3.0 | 0.90 |
| I | 5 | 2.1 | 4.2 | 60° | 60° | 21 | 14.7 | 14.7 | 43 | 0 | 3.17 | 1.05 | 8.93 | 9.97 | 2.7 | 3.0 | 0.90 |
| J | 4 | 3.5 | 2.5 | 45° | 60° | 21 | 12.7 | 11.4 | 56 | 25 | 4.19 | 1.3 | 8.42 | 6.35 | 4.3 | 3.2 | 1.33 |
| K | 4 | 3.5 | 2.5 | 45° | 60° | 21 | 12.7 | 11.4 | 56 | 25 | 4.19 | 0.69 | 8.42 | 6.65 | 7.6 | 6.0 | 1.27 |
|   | 5 | 0.6 | 2.5 | 0 | 20° |   |   |   |   |   |   |   |   |   |   |   |   | the radial direction exceeds the components of fiber orientation in both the axial and circumferential directions. The swell data of a hose produced with Die D having an area expansion of 5:1 shows that the fibers are highly oriented toward the radial direction. The data confirm that the majority of fibers are oriented toward the radial direction since the reciprocal of percent swell in the radial direction ($1 \div 4.8 = 0.208$) is greater than the sum of the reciprocals of the percent swell in the axial and circumferential directions ($1 \div 12.2 = 0.082$) + ($1 \div 13.1 = 0.076$) = 0.158. The swell data for a hose produced with Die E having an area expansion of 4:1 indicates that changes in both the fiber loading of the composite and the angle of the walls of the weir do not significantly influence the degree of fiber orientation since the component of fiber orientation in the radial direction still exceeds either of the components of fiber orientation in the other directions. Dies F and G have weirs of different heights protruding from the outer die member. The data indicate that in hoses produced with this die configuration the component of fiber orientation in the circumferential direction is greater than obtained in hoses produced with dies having weirs on the mandrel at equal area expansion but that the component of fiber orientation in the radial direction still exceeds the components of fiber orientation in either of the other directions.

The preparation of hoses exhibiting improved burst strength are demonstrated in Tables III and IV. Composite is extruded and cured in a manner similar to the hoses of Tables I and II except dies with constrictions located near the channel outlet are used to constrict the extrudate immediately upstream from the channel outlet. The meaning of the symbols for the channel dimensions are as follows: Doo is the diameter of the outer die member at the channel outlet; Dmo is the diameter of the mandrel at the channel oulet; Dic is the diameter of the mandrel between the channel inlet and the constriction at the outlet; Lio is the length of the channel from the inlet to the outlet; Lco is the length of the constriction located at the outlet. Die H has about 20% constriction at the outlet whereas Die I is a control having no constriction at the outlet; in the table the dimension

TABLE IV

| Die | $\frac{Ao}{Ai}$ | Pressure at Burst Kg/sq.cm. | Percent Swell | | |
|---|---|---|---|---|---|
| | | | Axial | Circum. | Radial |
| H | 2.7 | 13.0 | — | — | — |
| I | 2.7 | 10.9 | — | — | — |
| J | 4.3 | 20.4 | 13.9 | 10.4 | 8.5 |
| K | 7.6 | 20.2 | 15.3 | 10.0 | 6.7 |

Properties of hoses prepared using the dies of Table III are shown in Table IV. Comparison of the pressure at burst of hoses prepared using Dies H and I demonstrate that the hoses prepared with Die H exhibit improved burst strength. Similarly, a comparison between a hose prepared with Die K and a hose prepared with Die G (no constriction) of Table II indicates that Die K with constriction at the outlet exhibits about 10% higher burst strength. The overall area expansion of Die J falls between that of Dies C and D of Table II. However, the burst strength of hose produced by Die J exceeds that of hoses from either Die C or Die D by over 30%.

The invention includes multilayer hoses in which two or more layers of material are joined to form a single hose having different fiber orientation in each layer. For example, via a cross-head extruder, two hoses are extruded in which one hose envelops the other to form a single bi-layer hose. By selecting a die of the proper geometry for each layer a hose having radial orientation in the inner layer and axial orientation in the outer layer or vice versa may be prepared. A bi-layer hose in which the inside layer is reinforced with fibers predominately oriented in the circumferential direction and the outer layer is reinforced with fibers predominately oriented in either the radial or the axial directions is especially recommended for high performance applications. By operation of two cross-head extruders in tandem tri-layer hoses may be prepared in which predominate fiber orientation may be different in each layer. Alternately, layered hoses may be prepared in a co-extrusion process using a single head fed by multiple extruders.

Although the invention has been illustrated by typical examples, it is not limited thereto. Changes and modifications of the examples of the invention herein chosen for purpose of disclosure can be made which do not constitute departure from the spirit and scope of the invention.

The embodiments of the invention in which an exclusive property of privilege is claimed are defined as follows:

1. A process for preparing hose of extrudable polymer reinforced with discontinuous fibers which comprises extruding composite comprising extrudable polymer and 5-200 parts by weight discontinuous fibers per 100 parts by weight matrix through a die having a channel of curvilinear cross-section formed between surfaces of a central mandrel and an outer die member in which (Ao/Ai) is about two or more and (Wo/Wi) ÷ (Ro/Ri) is two or more wherein Ao is the channel outlet area, Ai is the channel inlet area, Wo is the channel width at the outlet, Wi is the channel width at the inlet, Ro is the channel outlet main radius, and Ri is the channel inlet mean radius to form an extruded hose in which the radial component of fiber orientation exceeds the circumferential component of fiber orientation.

2. The process of claim 1 which comprises extruding composite through an annular channel.

3. The process of claim 2 to form hose in which the radial component of fiber orientation exceeds the axial component of fiber orientation which comprises extruding composite through an annular channel in which the outlet area is about three or more times the inlet area.

4. The process of claim 3 to form hose in which the fibers are highly oriented in the radial direction which comprises extruding composite through an annular channel in which the outlet area is about five or more times the inlet area.

5. The process of claim 1 which comprises extruding a composite comprising elastomer and about 5-75 parts by weight fiber per 100 parts by weight of matrix.

6. The process of claim 5 in which the fibers are wood cellulose treated to reduce fiber to fiber interaction, the wood cellulose being the major proportion of the treated fiber.

7. The process of claim 3 which comprises extruding a composite comprising elastomer and about 5-75 parts by weight fiber per 100 parts by weight of matrix.

8. The process of claim 7 in which the fibers are wood cellulose treated to reduce fiber to fiber interaction, the wood cellulose being the major proportion of the treated fiber.

9. The process of claim 4 which comprises extruding a composite comprising elastomer and about 5-75 parts by weight fiber per 100 parts by weight of matrix.

10. The process of claim 9 in which the fibers are wood cellulose treated to reduce fiber to fiber interaction, the wood cellulose being the major proportion of the treated fiber.

11. The process of claim 1 in which the surface of the mandrel is substantially parallel to or converges toward the axis of the die and the surface of the outer die member which forms the channel is substantially parallel to or diverges from the axis of the die and in which the channel length is five or more times the channel width.

12. The process of claim 11 in which the surface of the mandrel which forms the channel is substantially parallel to the axis of the die.

13. The process of claim 11 in which the surface of the mandrel which forms the channel converges toward the axis of the die.

14. The process of claim 12 in which the surface of the outer die member which forms the channel is substantially parallel to the axis of the die.

15. The process of claim 13 in which the surface of the outer die member which forms the channel is substantially parallel to the axis of the die.

16. The process of claim 12 in which the surface of the outer die member which forms the channel diverges from the axis of the die.

17. The process of claim 13 in which the surface of the outer die member which forms the channel diverges from the axis of the die and in which the channel has a land portion at the outlet comprising surfaces parallel to the axis and a length of two or more times the channel width.

18. The process of claim 14 in which a weir protrudes from the surface of the mandrel at the inlet of the channel.

19. The process of claim 1 in which (Wo/Wi) ÷ (Ro/Ri) is three or more.

20. The process of claim 19 in which (Wo/Wi) ÷ (Ro/Ri) is four or more.

21. The process of claim 3 in which (Wo/Wi) ÷ (Ro/Ri) is three or more.

22. The process of claim 21 in which (Wo/Wi) ÷ (Ro/Ri) is four or more.

23. The process of claim 4 in which (Wo/Wi) ÷ (Ro/Ri) is three or more.

24. The process of claim 23 in which (Wo/Wi) ÷ (Ro/Ri) is four or more.

25. The process of claim 1 to form hose with improved burst strength which comprises extruding composite through a die in which the channel outlet area is greater than the channel inlet area but which channel is constricted at the outlet to reduce the outlet area to about 5 to 25 percent from the maximum channel area within the die.

26. The process of claim 3 to form hose with improved burst strength which comprises extruding composite through a die in which the channel outlet area is greater than the channel inlet area but which channel is constricted at the outlet to reduce the outlet area about 5 to 25 percent from the maximum channel area within the die.

27. The process of claim 4 to form hose with improved burst strength which comprises extruding composite through a die in which the channel outlet area is greater than the channel inlet area but which channel is constricted at the outlet to reduce the outlet area about 5 to 25 percent from the maximum channel area within the die.

28. The process of claim 27 which comprises extruding a composite comprising elastomer and about 5-75 parts by weight fiber per 100 parts by weight of matrix.

29. The process of claim 28 in which the fibers are wood cellulose treated to reduce fiber to fiber interaction, the wood cellulose being the major proportion of the treated fiber.

30. The process of claim 1 wherein composite is extruded through a die in which the mandrel is set off-axis.

31. The process of claim 8 wherein composite is extruded through a die in which the mandrel is set off-axis.

32. The process of claim 14 wherein composite is extruded through a die in which the mandrel is set off-axis.

33. The process of claim 1 wherein the surfaces of the mandrel and outer die member terminate in a land portion of the die in which the surfaces extend substantially parallel to the axis of the die.

34. The process of claim 11 wherein the surfaces of the mandrel and outer die member terminate in a land portion of the die in which the surfaces extend substantially parallel to the axis of the die.

35. The process of claim 17 wherein the surfaces of the mandrel and outer die member terminate in a land portion of the die in which the surfaces extend substantially parallel to the axis of the die.

* * * * *

UNITED STATES PATENT OFFICE
CERTIFICATE OF CORRECTION

PATENT NO. : 4,057,610
DATED : NOVEMBER 8, 1977
INVENTOR(S) : L. A. GOETTLER ET AL

It is certified that error appears in the above-identified patent and that said Letters Patent are hereby corrected as shown below:

Column 2, line 11: "means" should be --mean--.

Column 2, line 12: "member" should be --members--.

Column 10, line 29: "+" should be --$\pm$--.

Signed and Sealed this

Twenty-second Day of May 1979

[SEAL]

Attest:

RUTH C. MASON
Attesting Officer

DONALD W. BANNER
Commissioner of Patents and Trademarks